(12) United States Patent
Chen

(10) Patent No.: US 7,605,925 B1
(45) Date of Patent: Oct. 20, 2009

(54) HIGH-DEFINITION VERTICAL-SCAN INTERFEROMETRY

(75) Inventor: Dong Chen, Tucson, AZ (US)

(73) Assignee: Veeco Instruments, Inc., Tucson, AZ (US)

( * ) Notice: Subject to any disclaimer, the term of this patent is extended or adjusted under 35 U.S.C. 154(b) by 184 days.

(21) Appl. No.: 11/473,447

(22) Filed: Jun. 23, 2006

(51) Int. Cl.
*G01B 11/02* (2006.01)

(52) U.S. Cl. ...................... 356/511; 356/497

(58) Field of Classification Search ........... 356/511, 356/496, 497
See application file for complete search history.

(56) References Cited

U.S. PATENT DOCUMENTS

| | | | | |
|---|---|---|---|---|
| 4,500,816 | A * | 2/1985 | Murphy | 315/368.18 |
| 5,142,291 | A * | 8/1992 | Chang et al. | 342/424 |
| 5,471,303 | A * | 11/1995 | Ai et al. | 356/497 |
| 5,633,715 | A * | 5/1997 | Ai et al. | 356/497 |
| 5,999,263 | A * | 12/1999 | Deck et al. | 356/511 |
| 6,624,894 | B2 * | 9/2003 | Olszak et al. | 356/511 |
| 6,639,685 | B1 * | 10/2003 | Gu et al. | 356/603 |
| 6,987,570 | B1 * | 1/2006 | Schmit et al. | 356/511 |
| 7,230,717 | B2 * | 6/2007 | Brock et al. | 356/495 |
| 7,277,183 | B2 | 10/2007 | Deck | |
| 7,283,250 | B2 * | 10/2007 | Schmit et al. | 356/512 |
| 7,298,497 | B2 * | 11/2007 | Millerd et al. | 356/512 |
| 7,321,430 | B2 | 1/2008 | Deck | |
| 7,321,431 | B2 * | 1/2008 | De Groot | 356/497 |
| 2004/0085544 | A1 * | 5/2004 | De Groot | 356/497 |

OTHER PUBLICATIONS

Matthias Fleischer et al., "Fast Algorithms for Data Reduction in Modern Optical Three-Dimensional Profile Measurement . . . ," Applied Optics. vol. 39, No. 8, Mar. 2000.

* cited by examiner

*Primary Examiner*—Michael A Lyons
*Assistant Examiner*—Scott M Richey
(74) *Attorney, Agent, or Firm*—Antomo R. Durando

(57) ABSTRACT

A broadband interferometric vertical scan of a sample surface is performed to produce interference data in conventional manner. A coarse surface profile of the surface is obtained in real time using a conventional technique, such as a center-of-mass calculation. A fine surface map is obtained concurrently using a quadrature-demodulation algorithm applied in real time to the same interference data used for the coarse surface calculation. The fine surface map is then combined with the coarse surface profile using an unwrapping technique that produces a final surface map with sub-nanometer resolution within a large height range.

9 Claims, 14 Drawing Sheets

HIGH-DEFINITION VERTICAL-SCAN INTERFEROMETRY

BACKGROUND OF THE INVENTION

1. Field of the Invention

This invention relates in general to vertical-scanning interferometric (VSI) techniques for surface characterization. In particular, it relates to a new method for combining information about the peak of the envelope and the phase of a VSI correlogram.

2. Description of the Related Art

Optical surface profilometry enables the performance of non-contact measurements of fragile surfaces with high resolution and at high measurement speeds. Several widely accepted techniques are available for calculating surface topography from optical interference data.

Phase-shifting interferometry (PSI), for example, is based on changing the phase difference between two coherent interfering beams at a single wavelength, $\lambda$, in some known manner, for example by changing the optical path difference (OPD) either continuously or discretely with time. Several measurements of light intensity with different OPD values, usually equally spaced, at a pixel of a photodetector can be used to determine the phase difference between the interfering beams at the point on a test surface corresponding to that pixel. Based on such measurements at all pixels with coordinates (x,y), a phase map $\Phi(x,y)$ of the test surface can be obtained, from which very accurate data about the surface profile may be obtained using well known algorithms.

PSI provides a vertical resolution on the order of $1/1000$ of a wavelength or better; thus, it is well suited for characterizing smooth, well-reflecting surfaces. At the same time, the PSI technique has a limited vertical range of application because of the so-called $2\pi$ ambiguity; i.e., the fact that the phase shift between two beams is repeated with $2\pi$ periods every time the OPD exceeds a distance of $\lambda/2$. This "phase wrapping" behavior of PSI leads to ambiguity in the measurements of the surface profile when the surface features are higher than $\lambda/2$. Thus, in practice, conventional PSI techniques have been limited to measurements of fairly smooth and continuous surfaces because only in such cases can phase-unwrapping algorithms be applied to reconstruct the surface shape.

Large-step, rough, or steep-surface measurements, on the other hand, have been traditionally carried out with white-light (or broadband-light) vertical-scanning interferometry (VSI). As conventionally implemented, VSI uses a white-light source and the reference arm of the interferometer is scanned vertically with respect to a stationary test sample (or vice versa). In VSI, the degree of contrast of fringes produced on the detector by two interfering beams (instead of their phases) is measured as a function of distance between the reference and test surfaces to obtain information about the test surface. The contrast of a VSI interferogram is maximum when the OPD approaches zero, as illustrated in FIG. 1, and the test surface topography may be reconstructed by determining the peak position of the envelope of the interferogram for each detector pixel. The VSI approach overcomes the limited scanning range associated with PSI techniques, but suffers from significantly lower resolution (about 3 nm) and, therefore, is not as precise as PSI.

Together, PSI and VSI make it possible to measure most samples. However, they do not allow measurement of samples that combine smooth surfaces with large profile gradients. Measuring the profile discontinuities of such samples requires the large scanning range of VSI, while characterizing a smooth surface texture requires a PSI resolution. This problem has been recently addressed by the development of an enhanced VSI algorithm (named EVSI in the art) that combines both PSI and VSI. As illustrated in FIG. 2, the EVSI algorithm involves two sequential steps. First, a series of frames, spaced approximately $\square/8$ apart, is captured as the test surface is scanned through focus (OPD=0) in VSI mode and a coarse height is calculated by determining the frame position closest to the peak of the envelope of the correlogram ($I_{max}$). Once the peak frame position is found, a series of frames around the peak frame (frames 1 through 5 in the figure) is used in conventional PSI mode to acquire phase data in the proximity of the peak frame. By combining these two sets of data, the height of each point of the surface is determined with sub-nanometer resolution over the entire scanning range of the VSI profilometer.

However, the EVSI technique is limited in several aspects. First, conventional PSI n-frame algorithms are very sensitive to phase-step errors between scan frames. Small random errors in the frame step (such as due to scanner error or vibration, for example) can cause significant noise on the calculated phase map, such as the so-called fringe print-through error. Second, since the phase is determined from a series of frames around the peak frame of the correlogram's envelope, the phase at each pixel depends on the peak frame position for the pixel. Thus, the signal-to-noise ratio of the phase map is deteriorated by the uncertainty associated with defining frame positions with respect to the peak of each envelope. In other words, all errors present in the calculation of the VSI coarse map are propagated to the PSI phase map (therefore, it is difficult to obtain independent high-resolution or PSI-like phase maps). Third, for high-speed scanning where frames are acquired at a phase step (also referred to herein as the scan step) of $(2n+1)\pi/2$ (where $n=1, 2, 3 \ldots$), the error accumulated in the frame positions using EVSI can be significant. Fourth, the fact that the calculation of phase data can be carried out only after acquisition of all frame data and calculation of the peak of the envelope data requires storing of all frame data until all calculations have been completed at the end of the scan, which limits real-time data processing capabilities and causes undesirable issues related to measurement throughput and limitations in computer memory requirements.

Therefore, it would be desirable to be able to combine VSI-scan data with a phase map of the surface obtained independently of the peak of the VSI envelope. It would also be desirable to determine the phase map in real time, simultaneously with the calculation of the VSI coarse surface-height profile. The present invention addresses this need by providing a method for handling conventional VSI-scan data that affords low-noise mapping with sub-nanometer resolution across a large scanning range. The method of the invention, called high-definition vertical-scan interferometry (hereinafter referred to as HDVSI), enables the determination of both the peak of the envelope and the phase of the correlogram in real time with calculations that are independent from one another. Also, the phase of the correlogram is determined based on cumulative data (i.e., based on all frames and independent of scanner position), which provides an additional advantage with respect to the prior art.

BRIEF SUMMARY OF THE INVENTION

The HDVSI method of the invention is carried out by performing the coarse calculation of surface profile with a conventional VSI method such as center of mass (COM), quadrature center of mass (QCOM), or zero crossing detection (ZCD). According to a primary aspect of the invention, the phase calculation is carried out concurrently using the same VSI frame data set. However, the phase calculation does not utilize the conventional n-frame phase shifting approach of the prior art. Instead, it utilizes a quadrature-demodulation (QD) algorithm applied to the irradiance data contained in the VSI correlogram. As a result, the phase calculation is independent of the position of any particular interferometric fringe and, therefore, it is more accurate and its results are more certain than those produced by the combined VSI/PSI methods of the prior art. Once both calculations are accomplished, the phase data are incorporated into the coarse profile data through a unique "unwrapping" method that yields a final surface map with sub-nanometer resolution within a large z-height range.

The HDVSI algorithm decouples the calculation of phase from the calculation of fringe-intensity peak. This results from the fact that QD manipulation of the correlogram data does not require a prior determination of the position of the intensity peak. Therefore, the calculated phase map of the surface does not inherit the errors produced by the calculation of the coarse map. According to another aspect to the invention, such errors are removed from the coarse map, prior to combining it with the phase map, by consistently rounding all VSI measurements to an integer multiple of $2\pi$. In other words, the VSI coarse map is rounded to an integer multiple of $\lambda/2$. (Typically, the accuracy of a VSI coarse map is much better than $\lambda/2$.) As a result, the VSI errors are completely removed from the VSI coarse map through the rounding process, which is not possible with prior-art approaches.

Because of their independent calculation, the HDVSI algorithm of the invention allows for simultaneous determination (not sequential, as in prior VSI/PSI techniques) of the coarse and phase maps of the sample surface. This advantage derives from the integrating nature of the QD method used for determining the phase of the correlogram. As a result, the calculations of both the coarse surface map and the phase map can be performed in parallel in real time (i.e., each interferometric data point is used as soon as it is acquired), unlike the algorithms of the prior art.

Another advantageous feature of the invention lies in the fact that conventional VSI apparatus can be utilized with the HDVSI algorithm to perform high-definition VSI measurements with sub-nanometer accuracy, to a degree that so far has been available only with single-wavelength interferometry. The only necessary changes are in the components required to round the VSI data, to implement the QD algorithm, and to combine the phase data with the corrected VSI data in real time as data are acquired during a scan.

Various other advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment, and particularly pointed out in the claims. However, such drawings and description disclose but a few of the various ways in which the invention may be practiced.

DETAILED DESCRIPTION OF THE INVENTION

The idea of the invention is to map a sample surface by determining simultaneously from a single VSI scan two independent parameters—the peak position of the fringe envelope and the phase of the correlogram, where the determination of the latter does not involve the use of a phase-shifting algorithm that requires the prior acquisition of all scan data. To that end, the correlograms produced at the light detector during a conventional VSI scan are processed in two different ways. On one hand, a conventional method is applied to the correlogram to calculate the peak of its envelope (at each pixel) to determine a coarse surface-height value. For example, a center-of-mass method (COM), or a quadrature COM, or a zero-crossing detection method (ZDE) may be used for this purpose. Mapping the surface with such a conventional method is known to produce a vertical resolution of approximately 3 nm rms on a smooth reflective sample. On the other hand, to refine the VSI surface map to a sub-nanometer resolution, the irradiance data collected during the VSI scan are additionally processed with a novel quadrature-demodulation (QD) algorithm that produces an independent high-definition phase map of the test surface. This phase map is then judiciously incorporated into the coarse VSI map to generate a high-definition map with the same sub-nanometer resolution produced by the QD procedure.

Collecting Scan Data

The invention is described throughout for convenience in terms of VSI (i.e., the process of determining the coherence peak of an interferogram produced by a mechanical scan), but the term is intended to refer as well and include any coherence-peak sensing method that may be applicable to the procedure. Therefore, the broader notion of producing a coarse map of the sample surface by finding the coherence peak of interference fringes, however produced, is intended to be part of and covered by this invention. Thus, the invention is intended to include any method that produces interference fringes by changing the optical difference between a test and a reference beam, such as, without limitation, mechanical scanning and polarization shifting methods.

Figure 3:
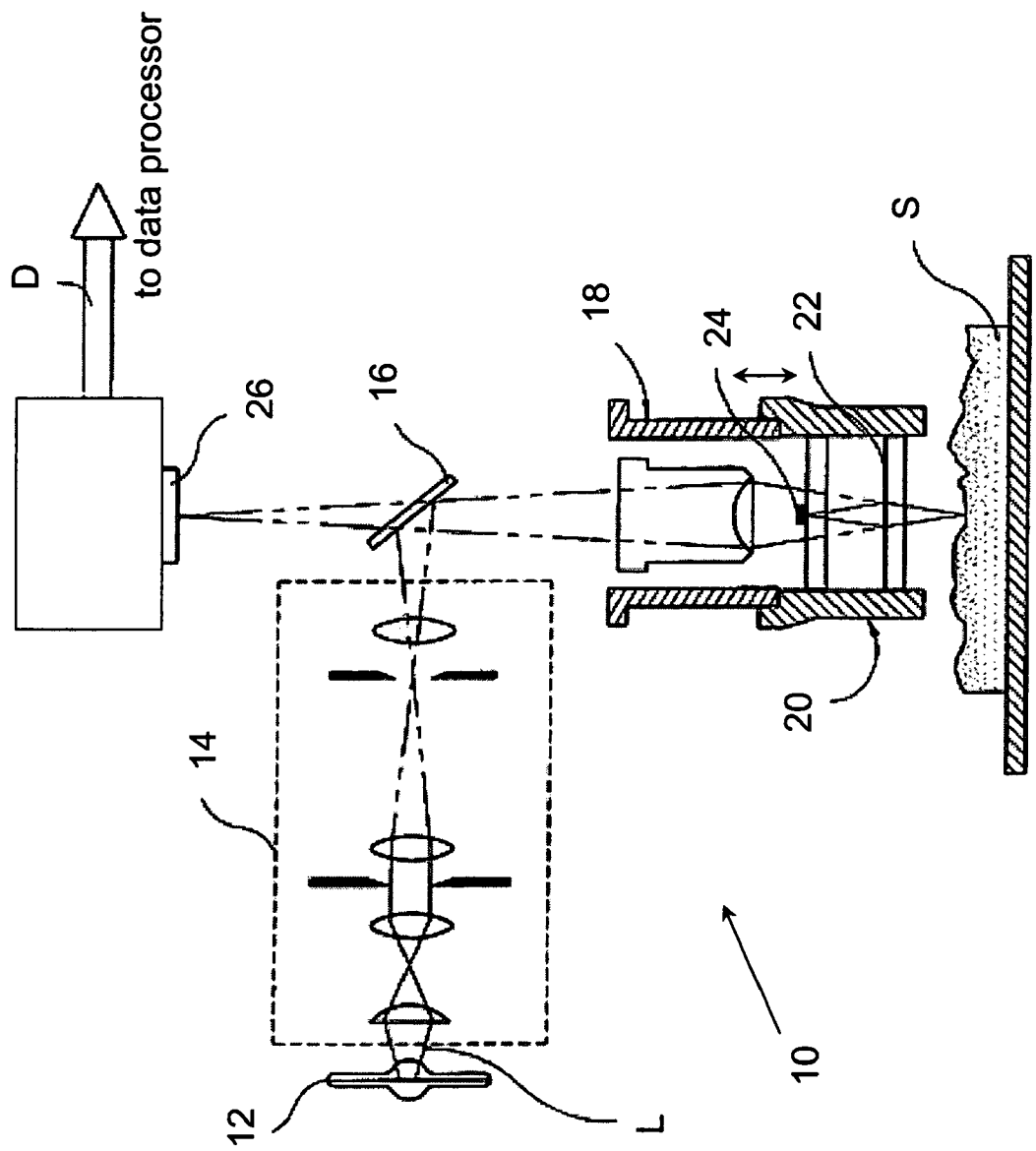
FIG. 3 is a schematic of a convention vertical-scanning interferometer for testing a sample surface.

The invention may be practiced with a conventional vertical scanning interferometer, such as shown schematically in FIG. 3 (wherein x and y define the plane of the test surface and z defines the direction of the vertical scan). The interferometer 10 comprises a broadband (such as white-light) source 12 directing a light beam L through illuminating optics 14 toward a beam-splitter 16 that reflects the light in the direction of a test surface S. The light reflected by the beam-splitter 16 passes through a microscope objective 18 that focuses it on the test surface S. The objective incorporates an interferometer 20, such as Mirau, comprising a beam-splitter 22 and a reference mirror 24 adapted for a large-range relative movement (hundreds of microns) with respect to the surface S by utilizing a motorized translator (not shown).

During the scan of the objective 18 with respect to the surface S (or vice versa), two light beams are generated (one in reflection from the mirror 24 and another in reflection from the surface S) to produce interference fringes as a result of the optical path difference between the reference mirror 24 and the surface S. The portions of light reflected from the reference mirror and the surface propagate back through the objective 18 and further through the beam-splitter 16 towards a CCD detector 26. Appropriate electronic components (not shown) are provided to transmit the digitized intensity data D generated by the detector 26 for further processing. Typically, the interferometer 10 is additionally equipped with a calibrating arm (not shown) employing a single-wavelength light source for calibrating the scanning process.

Calculating Surface Maps

Figure 1:
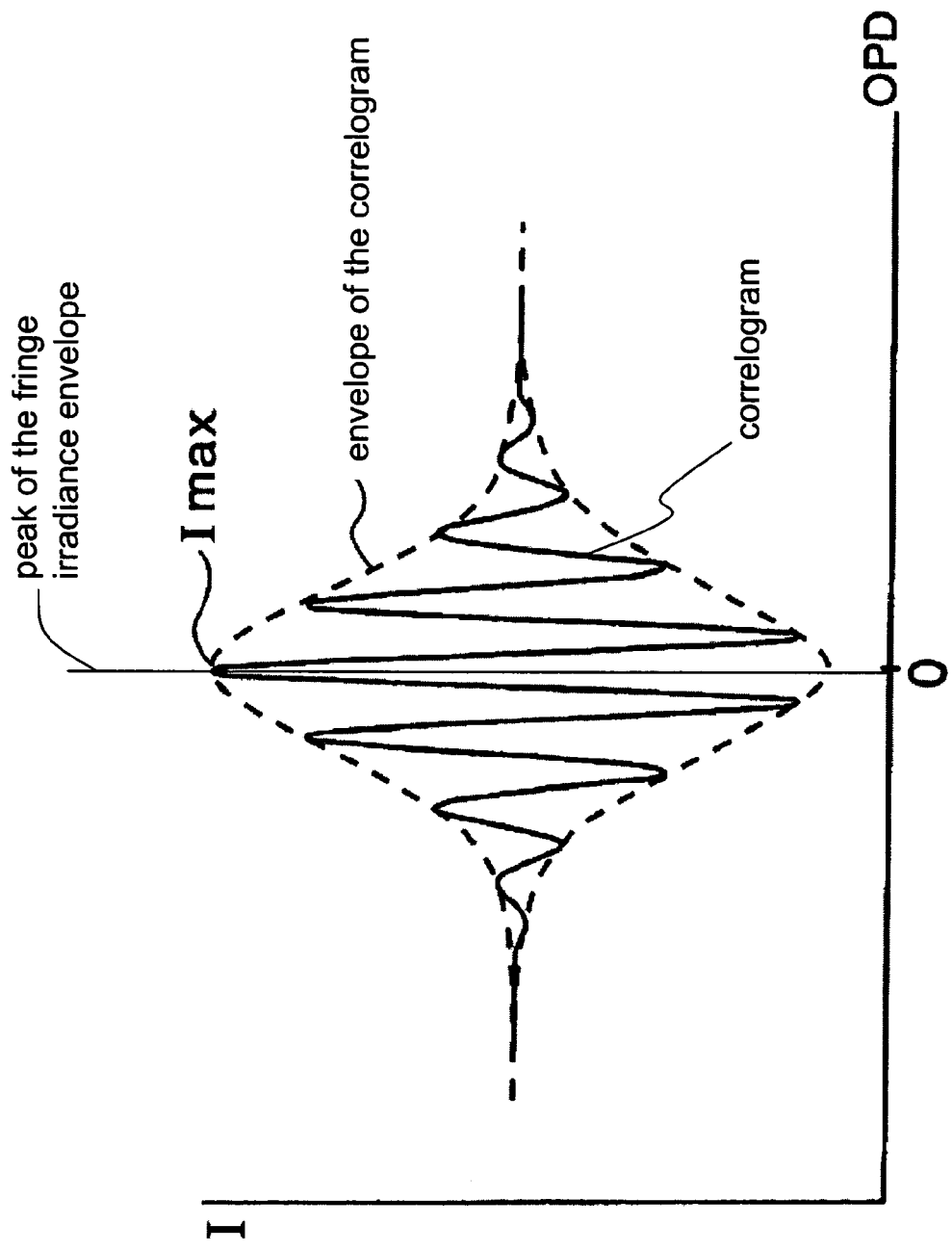
FIG. 1 is an illustration of the interferometric signal obtained during a typical white-light VSI scan as a function of the OPD between the reference and the test surfaces.
Figure 2:
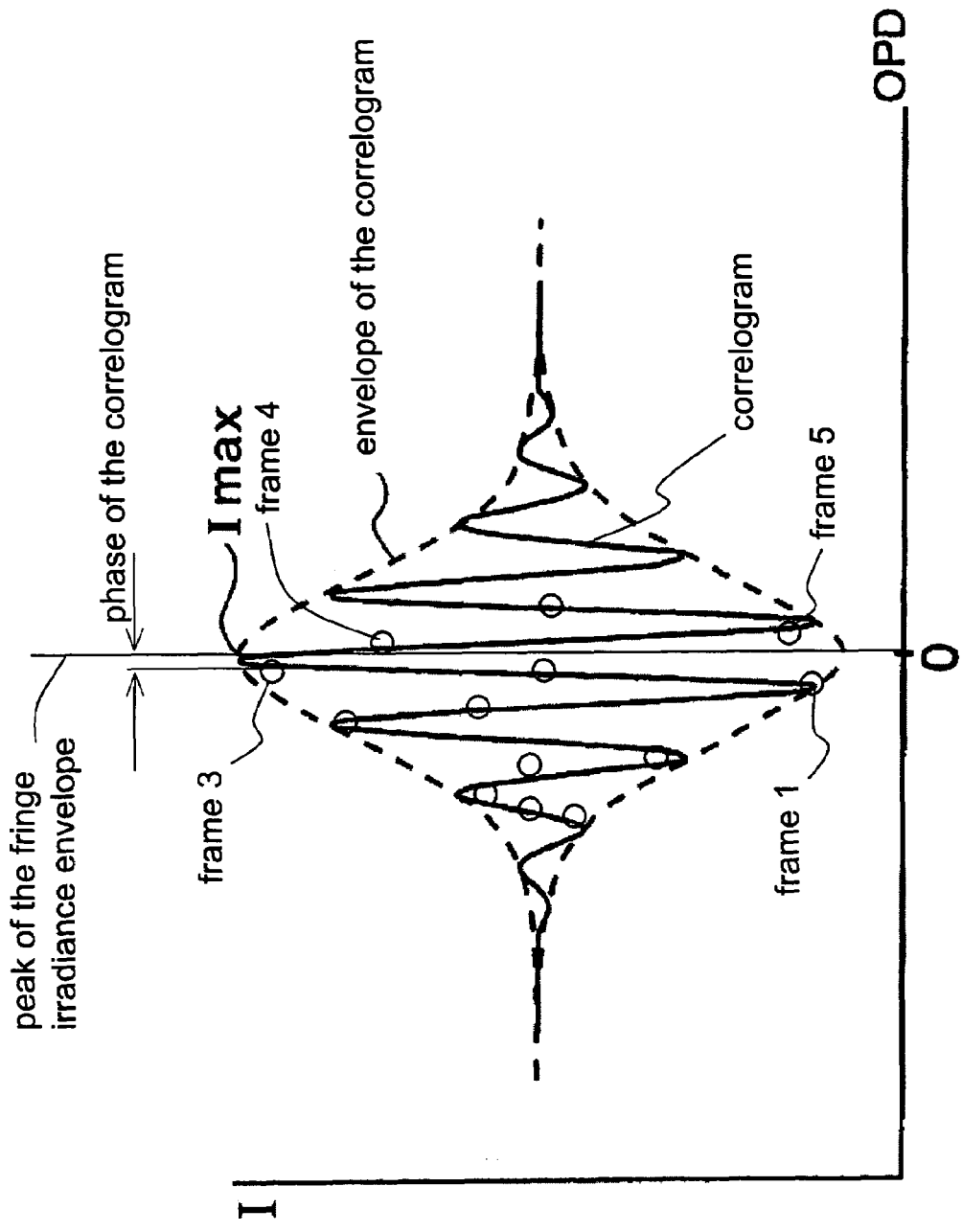
FIG. 2 illustrates the process of determining the peak of the envelope and the phase of the white-light correlogram of FIG. 1 with the EVSI approach.

As the VSI scan is implemented through a plurality of scanning steps of predetermined size (referred to in the art as scan steps or phase steps), each detector pixel produces a signal with an amplitude that passes through and drops off very rapidly from its maximum value ($I_{max}$, corresponding to zero OPD—see FIG. 1). The interferometric signal can be expressed as $$I(n) = G(z_n - z_0)\cos(n\Delta\phi + \Phi), \quad (1)$$

where $G(z_n - z_0)$ is the Gaussian envelope of the correlogram; $z_0$ and $z_n$ are the positions of the scanning objective at zero OPD and at the nth scanning step; and $\Delta\phi$ and $\Phi$ are the phase step of the scan and the phase of the correlogram, respectively. According to the invention, the interferometric signals I are manipulated with the HDVSI algorithm according to the procedure illustrated in the block diagram of FIG. 4 to produce a low-noise sub-nanometer resolution surface map, $z_{HDVSI}(x,y)$.

The HDVSI algorithm comprises several steps. Possibly after undergoing pre-processing filtration, if needed, the input to the algorithm (i.e., the interferometric irradiance signals produced by the VSI scan) is processed simultaneously in two ways that allow for the independent calculation of a coarse height $z_0$ of each surface point and of the phase $\Phi$ of the correlogram corresponding to that point. In the aggregate, the values of $z_0$ and $\Phi$ for all surface points imaged onto the light detector yield the coarse surface map, $z_{VSI}(x,y)$, and the high-definition phase map, $\Phi(x,y)$, of the test surface, respectively. As one skilled in the art would readily understand, the phase map $\Phi(x,y)$ can be equivalently expressed as a fine surface (or height) map, $z_{HD}(x,y)$, because the phase shift between two surface points is directly proportional to the difference in their heights. Therefore, for the purposes of this disclosure, the maps $\Phi(x,y)$ and $z_{HD}(x,y)$ and the corresponding terms "phase map," "surface map," "height map" and "map" may be used interchangeably. As a separate step of the HDVSI algorithm, the two maps are judiciously combined to generate the final high-definition surface map, $z_{HDVSI}(x,y)$.

Figure 4:
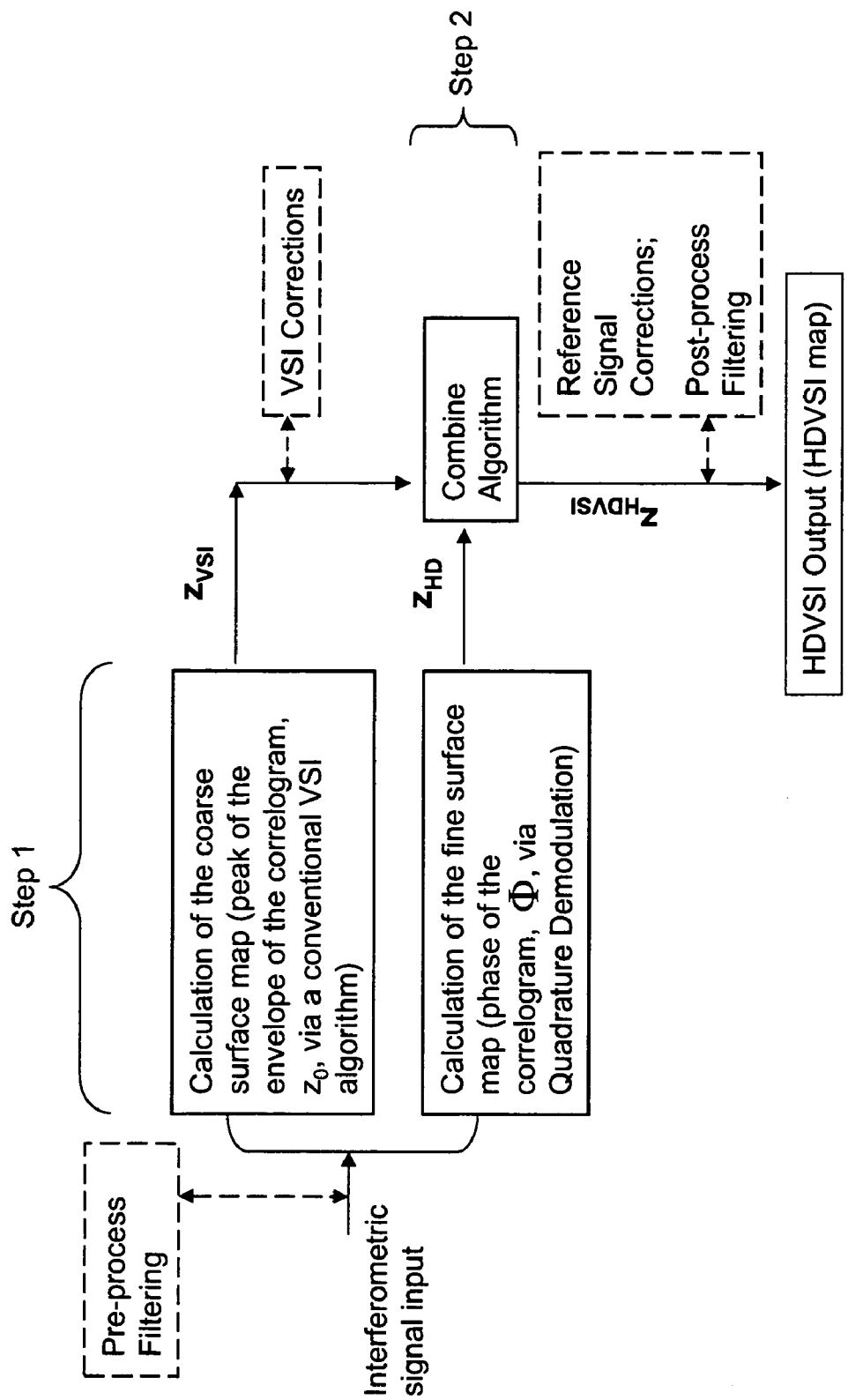
FIG. 4 is a block diagram of the high-definition VSI algorithm of the invention.

In practice, still referring to FIG. 4, the determination of the coarse surface height $z_0$ is carried out using a conventional VSI algorithm. For example, $z_0$ may be obtained with a QCOM method by determining the peak position of the modulation envelope $M(n)$ of the correlogram $M(n) = 2(G(z_{n+1}))^2$ by constructing a weighted average $$z_0 = \sum_{n=1}^{N} nM(n) \bigg/ \sum_{n=1}^{N} M(n)$$

in real time during the scan. Thus, a complete coarse VSI map, $z_{VSI}(x,y) = z_0(x,y)$, of the surface S (FIG. 3) is formed by applying the QCOM calculation to the correlogram produced by each pixel of the detector 26. Alternatively, other methods well known in the art, such as COM or ZCD, may be used to obtain the coarse map of the test surface.

Figure 5:
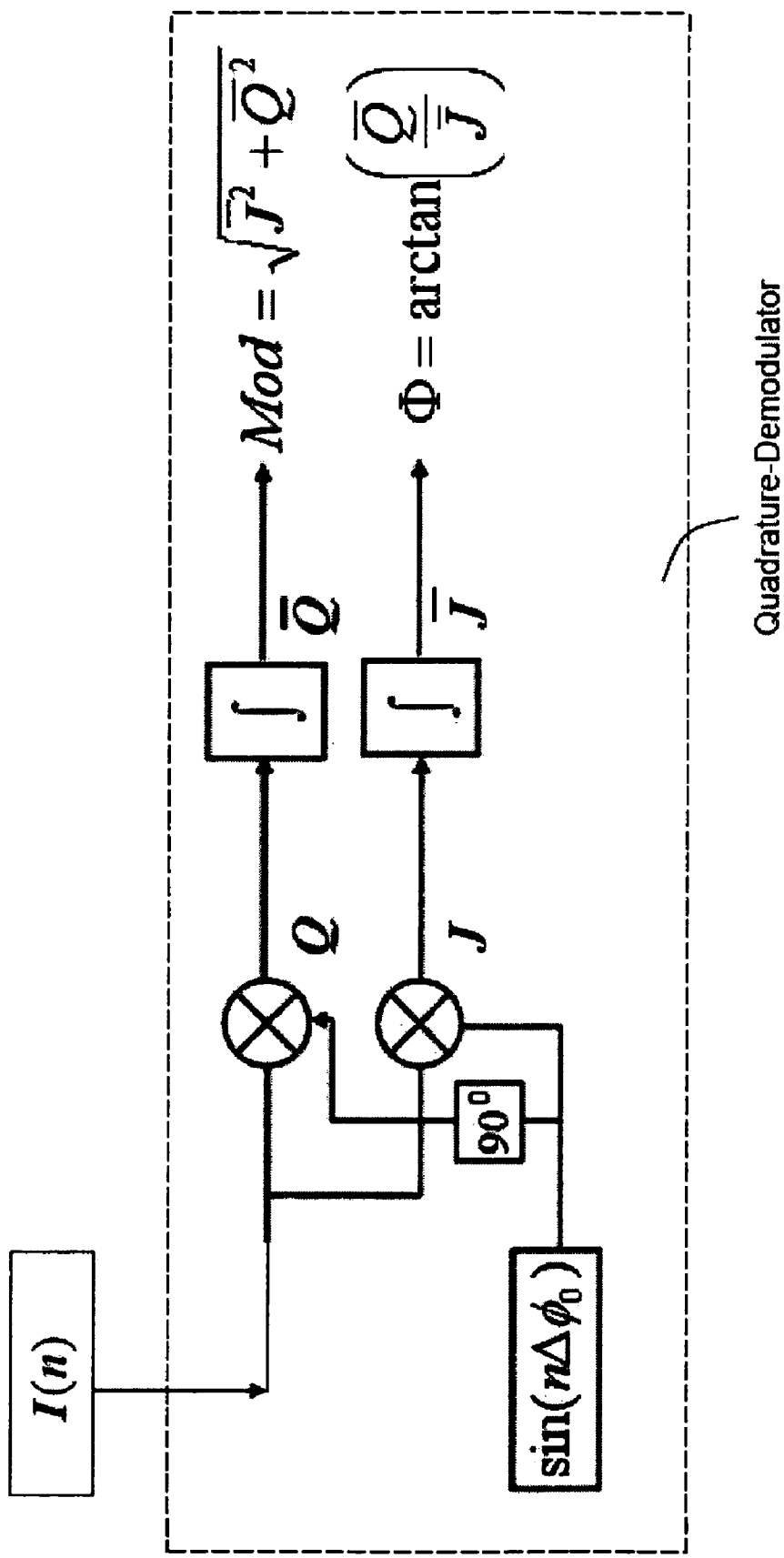
FIG. 5 illustrates schematically the preferred embodiment of the quadrature-demodulation algorithm of the invention.

The phase $\Phi$ of the correlogram, on the other hand, is determined by applying the novel high-definition quadrature-demodulation approach that is at the heart of the invention. Referring to FIGS. 4 and 5, the signal I(n) is passed through a QD filter that performs several operations. First, the correlogram signal is differentiated to eliminate the DC component in the original correlogram. Then, it is split into "in-phase" and "quadrature" signal components, J and Q, respectively, as $$J = I(n)\cos(n\Delta\phi_0) = \qquad (2a)$$
$$\frac{G}{2}\{\cos[n(\Delta\phi + \Delta\phi_0) + \Phi] + \cos[n(\Delta\phi - \Delta\phi_0) + \Phi]\}, \text{ and}$$

$$Q = \qquad (2b)$$
$$I(n)\sin(n\Delta\phi_0) = \frac{G}{2}\{\sin[n(\Delta\phi + \Delta\phi_0) + \Phi] - \sin[n(\Delta\phi - \Delta\phi_0) + \Phi]\},$$

where $\Delta\phi_0$ is the phase parameter of the filter. The parameter $\Delta\phi_0$ is preferably chosen to match the phase step of the scan, $\Delta\phi$ [typically equal to $(2m+1)\pi/2$, $m=0, 1, 2 \ldots$]. In the case where $\Delta\phi = \Delta\phi_0 = (2m+1)\pi/2$, the expressions for the in-phase and quadrature components of the correlogram become $$J = \frac{G}{2}\{\cos[n(2m+1)\pi + \Phi] + \cos\Phi\} \text{ and} \quad (3a)$$

$$Q = \frac{G}{2}\{\sin[n(2m+1)\pi + \Phi] - \sin\Phi\}. \quad (3b)$$

Then, the in-phase and quadrature components are integrated on-the-fly over all the scanning steps to obtain $$\bar{J} = \sum_{n=1}^{N} J = \frac{1}{2}\sum_{n=1}^{N} G(z_n)\cos[n(2m+1)\pi + \Phi] + \frac{1}{2}\cos\Phi\sum_{n=1}^{N} G(z_n) \approx \quad (4a)$$

$$\frac{1}{2}\cos\Phi\sum_{n=1}^{N} G(z_n) \text{ and}$$

$$\bar{Q} = \sum_{n=1}^{N} Q = \frac{1}{2}\sum_{n=1}^{N} G(z_n)\sin[n(2m+1)\pi + \Phi] - \frac{1}{2}\sin\Phi\sum_{n=1}^{N} G(z_n) \approx \quad (4b)$$

$$-\frac{1}{2}\sin\Phi\sum_{n=1}^{N} G(z_n),$$

from which the high-resolution phase of the correlogram is readily obtained as $$\Phi = \arctan\frac{\bar{Q}}{\bar{J}}. \quad (5)$$

As one skilled in the art would readily understand, the calculation of the phase value $\Phi$ according to Eq. (5) can be carried out in real time during the VSI scan due to the integrating nature of the QD technique, which does not require the prior acquisition of all scan data. Thus, the phase map $\Phi(x,y)$ of the entire surface S [and, therefore, also the fine map $z_{HD}(x,y)$] is obtained concurrently with the coarse map by applying the QD filter of FIG. 5 to the correlograms registered by each pixel of the detector 26 (FIG. 3). The determination of the phase map does not depend on the calculation of the coarse map $z_{VSI}(x,y)$ and, therefore, the result is independent from it. Since the phase map $\Phi(x,y)$ is "wrapped" every $2\pi$ radians, the fine surface map $z_{HD}(x,y)$ is also wrapped with an interval of $\lambda/2$, where $\lambda$ is the effective wavelength of the light source. It is understood that this QD procedure has been described for a VSI phase step of $(2m+1)\pi/2$, but the same principle would apply for any phase step as long as the phase parameter of the QD-filter were adjusted to match the scanning step.

Combining Maps and Correcting Errors of Calculation

Once both the coarse map, $z_{VSI}(x,y)$, and the fine map, $z_{HD}(x,y)$, of the surface have been so determined, the two maps are combined to produce the high-definition surface map $z_{HDVSI}(x,y)$ of the invention, as illustrated in FIG. 4. The principle of operation of the algorithm of the invention is best understood with reference to FIG. 6, wherein the various steps are illustrated graphically in terms of corresponding cross-sectional profiles produced by a relatively smooth, flat and tilted surface (used for simplicity and clarity of presentation). For convenience of illustration, the profiles are expressed in terms of VSI-scan frame number N, rather than actual surface height; that is, each scan step is used as the unit for measuring height, it being understood that a direct correspondence to actual height is provided by the scan-step size. The fine phase profile $z_{HD}$ and the coarse VSI profile $z_{VSI}$ (traces A and B, respectively) generated concurrently in real time by the interferometric scan constitute the starting point for calculating the final map $z_{HDVSI}$ (trace E).

Figure 6:
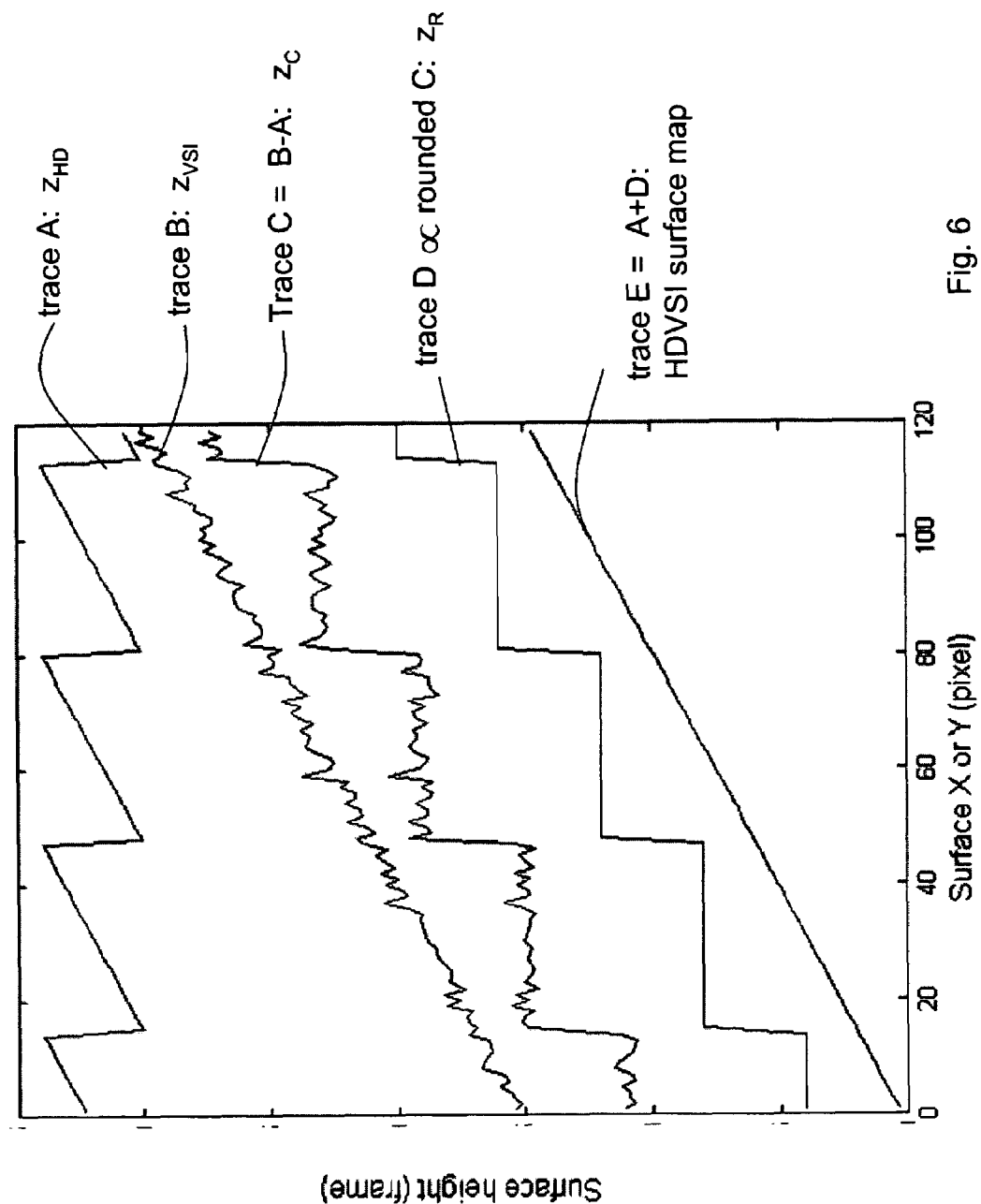
FIG. 6 illustrates graphically the correction and "unwrapping" process of the invention for deriving a high-definition surface map, $z_{HDVSI}(x,y)$, from the coarse and the fine surface maps, $z_{VSI}(x,y)$ and $z_{HD}(x,y)$, respectively.

According to the invention, the fine phase profile is first subtracted from the coarse VSI profile to produce a VSI-fringe profile, $z_C = z_{VSI} - z_{HD}$ (trace C). That is, trace C is a profile of the VSI data expressed in terms of fringes, which, in an error-free environment, would occur periodically exactly after each number of scan steps corresponding to a $2\pi$ OPD produced by the scanning mechanism. Because the fine phase profile $z_{HD}$ represents a reliable measure of height within each phase period, once it is subtracted from the coarse VSI profile, the resultant VSI-fringe profile (trace C) is a stepped function increasing periodically by the number of frames required to produce a $2\pi$ change during the scan (i.e., a fringe; for example, N=4 when the scan step is $\pi/2$). (Note that this is true only because of the smooth surface used for the illustration; otherwise, the profile would also reflect any discontinuities in the surface.) Thus, to the extent trace C is not smooth for the surface of this example, it represents noise introduced by the VSI measurement. According to the invention, this noise is advantageously removed simply by rounding each value of the profile $z_C$ to a frame number corresponding to an integer fringe (i.e., a frame number N corresponding to a multiple of $2\pi$). Trace D in FIG. 6 shows such a rounded VSI-fringe profile, $z_R$, where noise is clearly no longer present. That is, portions of the original signal corresponding to a fraction of a fringe have been removed. Finally, the high-definition surface profile illustrated by trace E, $z_{HDVSI}$, is obtained by adding the fine surface profile $z_{HD}$ back to the noise-free VSI-fringe profile.

Thus, in general terms, the high-definition map of the invention can be expressed as $$z_{HDVSI} = z_{HD} + z_R, \quad (6)$$

where $z_R$ is the VSI height value $[z_{VSI}(x,y)]$ rounded to the nearest fringe using the relation $$z_R = N \times \text{round}\left[\frac{z_{VSI} - z_{HD}}{N}\right], \quad (7)$$

where N is the number of scan frames corresponding to a $2\pi$-OPD scan travel (the fringe period). Therefore, N is the ratio of $2\pi$ to the phase step of the scanner, $\Delta\phi$; i.e., $N\Delta\phi = 2\pi$, and N is equal to 4 when the VSI scan is performed with $\pi/2$ scan steps.

Figure 7:
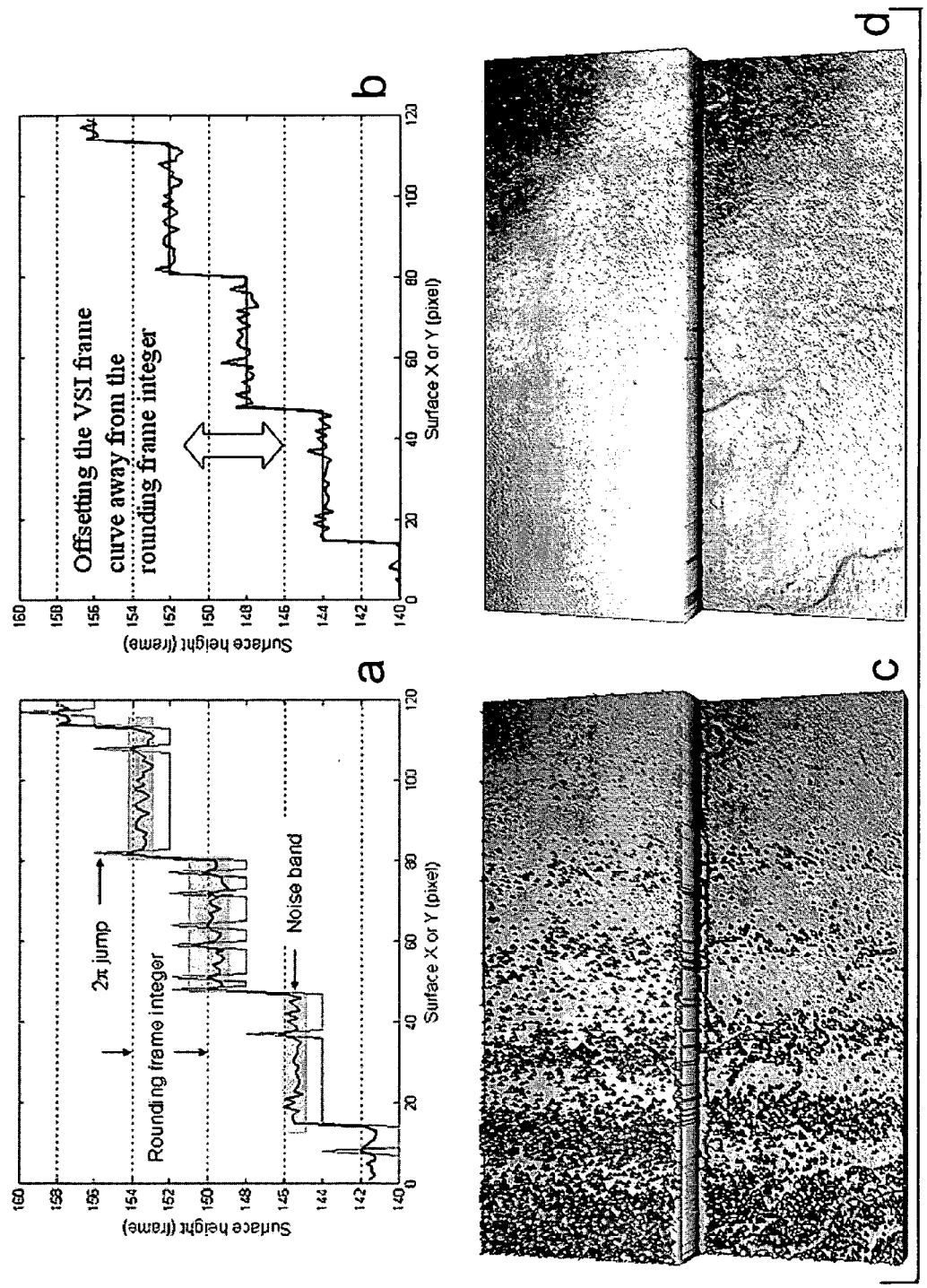
FIG. 7 illustrates graphically the frame-offset correcting feature of the invention, wherein a) shows that the lack of frame-offset correction may introduce artificial noise into the rounded VSI-fringe profile $z_R$ produced by the algorithm; b) shows that the frame-offset feature eliminates the noise and results in an accurate calculation of the VSI-fringe profile $z_R$; c) is a high-definition surface map $z_{HDVSI}(x,y)$ that shows artificial noise introduced by the algorithm without the frame-offset correction; and d) shows that the frame-offset feature results in a low-noise high-definition surface map.

As one skilled in the art would readily recognize, the rounding operation of the algorithm may itself introduce a rounding error that could be manifested in either an increase or a decrease in the frame number corresponding to a particular data point in the VSI-fringe profile $z_R$ (trace D of FIG. 6). This occurs when the aggregate amount of noise, $\epsilon$, present in $z_C$ (trace C of FIG. 6) no longer satisfies the condition $$\epsilon \leq l \leq N - \epsilon, \quad (8)$$

where l is an integer within an N frame range (or $2\pi$ range) resulting from the rounding Equation (7). In general, the possible values of l are 0, 1, 2, ... N. In the case of N=4, the possible values of l are 0, 1, 2, 3, 4. What Equation (8) shows is that, if l is too small (too close to 0) or if l is too large (too close to 4), then a $2\pi$ ambiguity occurs on the $z_R$ map for a given noise level $\epsilon$. This situation is illustrated in FIG. 7(a) where, due to the rounding procedure, some portions of trace D are erroneously rounded to different $2\pi$ levels. In this example, as shown in the figure, l is too close to 4. FIG. 7(c) provides the corresponding final map of the surface containing the rounding noise. Clearly, it is desirable that l be in the middle of the $2\pi$, or N frames range, i.e. l=N/2.

To correct this rounding error, the algorithm of the invention preferably incorporates a frame-offsetting adjustment capability that shifts the integer value of a frame by an offset amount, round(l+FO). The required value of FO is determined from $$\epsilon \leq l+FO \leq N-\epsilon. \qquad (9)$$

As stated above, l is desirably in the middle of the $2\pi$ range. If it is not, then the parameter FO can be used to shift l'=round(l+FO) to N/2. Once the frame-offsetting correction FO is so found, Equation 7 may be expressed in noise-free form in units of frames as $$z_R(x, y) = N \times round\left[\frac{Nn + l \pm \varepsilon + FO}{N}\right], \qquad (10)$$

where n is integer. The importance of this frame-offset correction is illustrated in FIGS. 7(b) and (d), which show the corrected trace D and the corresponding noise-free high-definition surface map $z_{HDVSI}$, respectively.

The same frame-offset capability can be used to correct small shifts (less than $2\pi$, or less than a fringe across the z range of the sample surface) of the interferometric fringes with respect to the peak of the envelope of the correlogram. (Such phase shifts may arise when the measured surface is slightly tilted with respect to the scanning axis z and leads potentially to a discrepancy between the surface shapes represented by $z_{VSI}(x,y)$ and $z_{HD}(x,y)$; therefore, these shifts produce $2\pi$ artifacts on the combined surface map.) The step of combining the two maps according to the HDVSI algorithm is also preferably preceded by correcting the coarse surface map, $z_{VSI}(x,y)$, if necessary, as indicated in FIG. 4. This correction may be required by measurement errors and artifacts produced during the course of the VSI scan (such as from tilt, steep curvature of the test surface with respect to the axis of the scan, or discontinuities in the test surface). This correction further increases the signal-to-noise ratio of the final map of the surface.

Figure 8:
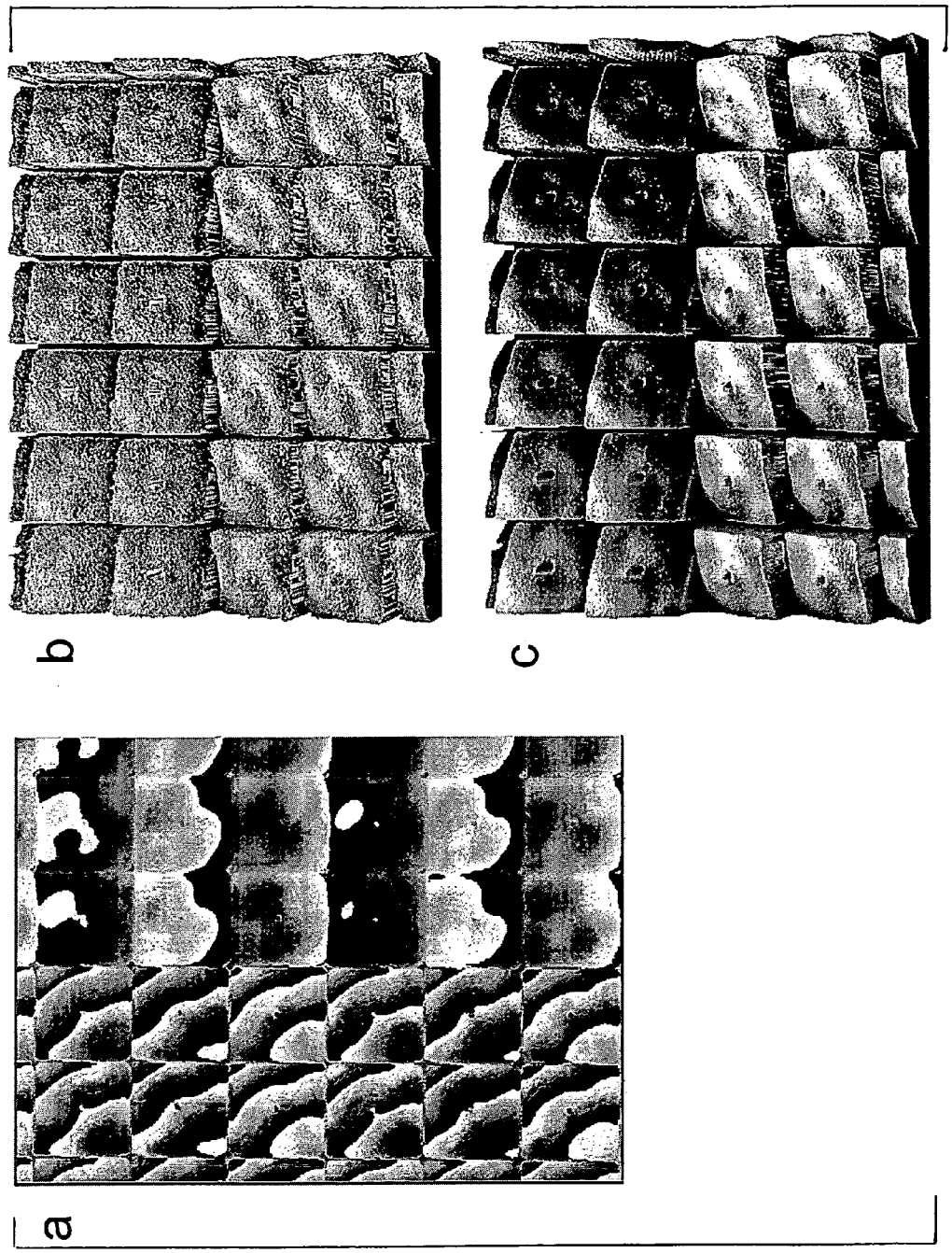
FIG. 8 shows the results of applying the algorithm of the invention to the surface measurement of a micro-mirror array, wherein a) is the phase map, $\Phi(x,y)$; b) is the coarse surface map, $z_{VSI}(x,y)$; and c) is the final, high-definition surface map, $z_{HDVSI}(x,y)$.
Figure 9:
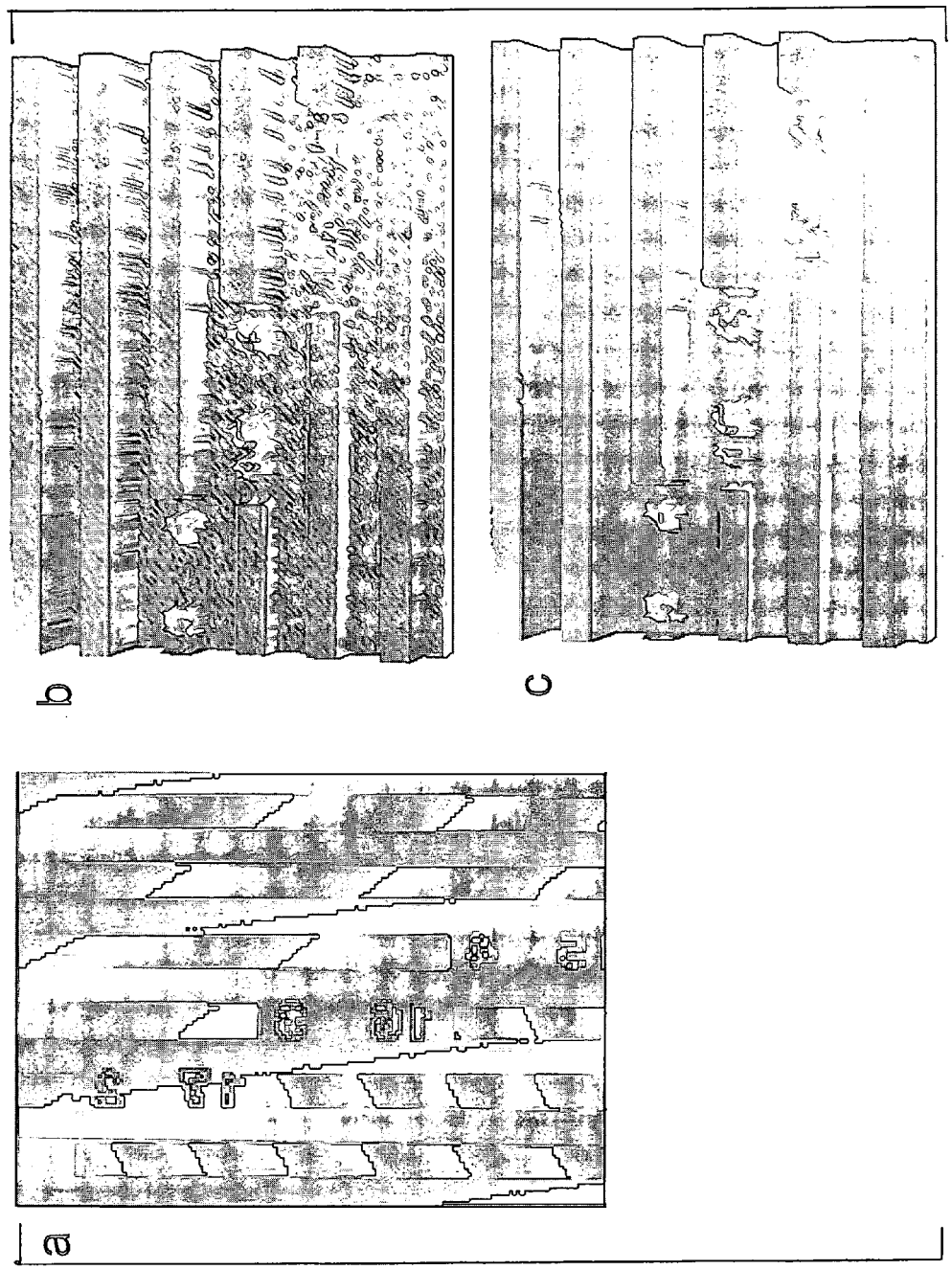
FIG. 9 shows the results of the measurement of a microlever array with the algorithm of the invention, wherein a) is the phase map, $\Phi(x,y)$; b) is the coarse surface map, $z_{VSI}(x,y)$; and c) is the final, high-definition surface map, $z_{HDVSI}(x,y)$.
Figure 10:
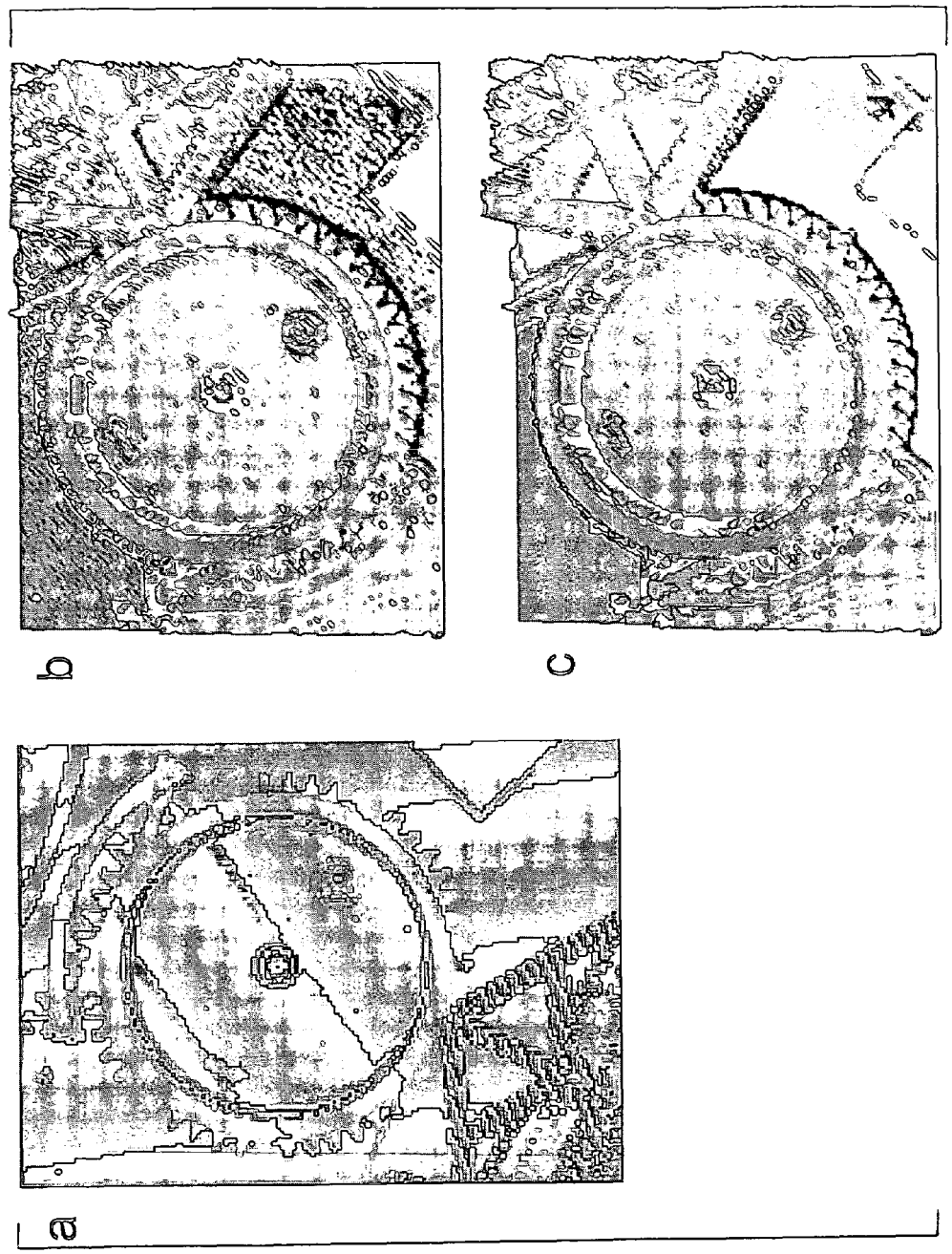
FIG. 10 shows the results of the measurement of a MEMS gear with the algorithm of the invention, wherein a) is the phase map, $\Phi(x,y)$; b) is the coarse surface map, $z_{VSI}(x,y)$; and c) is the final, high-definition surface map, $z_{HDVSI}(x,y)$.

It is noted that the algorithm of the invention operates by manipulating complete maps in comparison with the pixel-by-pixel approach of the prior art. This eliminates an additional source of "calculation" noise—i.e., that produced by "stitching" data among multiple pixels. This advantage stems from the fact that the two maps $z_{VSI}(x,y)$ and $z_{HD}(x,y)$ of the invention have been obtained simultaneously and independently and therefore each data point derived from the phase measurement corresponds directly to the coarse surface height data point with which it is combined. FIGS. 8, 9, and 10 illustrate concrete and tangible results produced by the HDVSI algorithm of the invention measuring various MEMS components.

Figure 11:
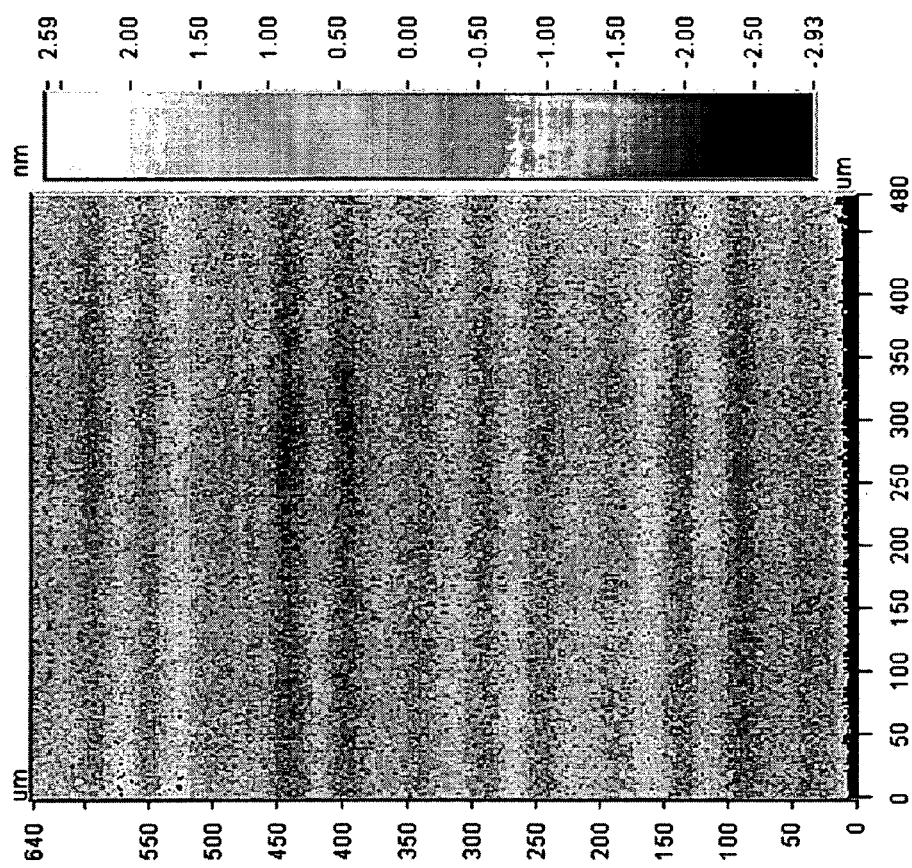
FIG. 11 is the map of a flat surface calculated using an EVSI algorithm.
Figure 12:
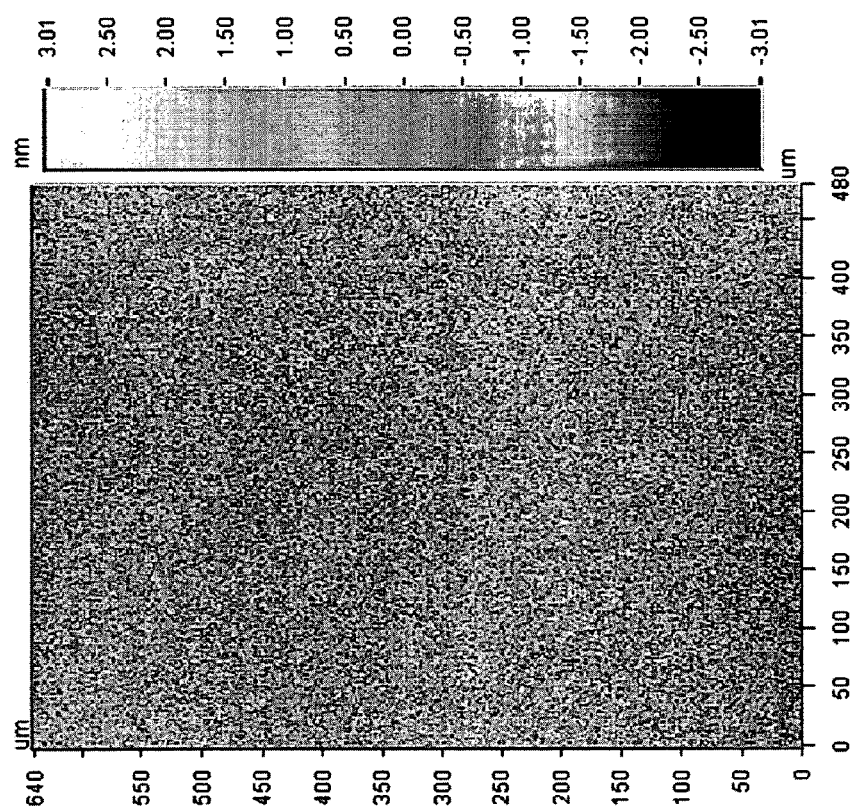
FIG. 12 is the map of the flat surface of FIG. 11 obtained with the HDVSI algorithm of the invention using the same interferometric data that produced FIG. 11.
Figure 13:
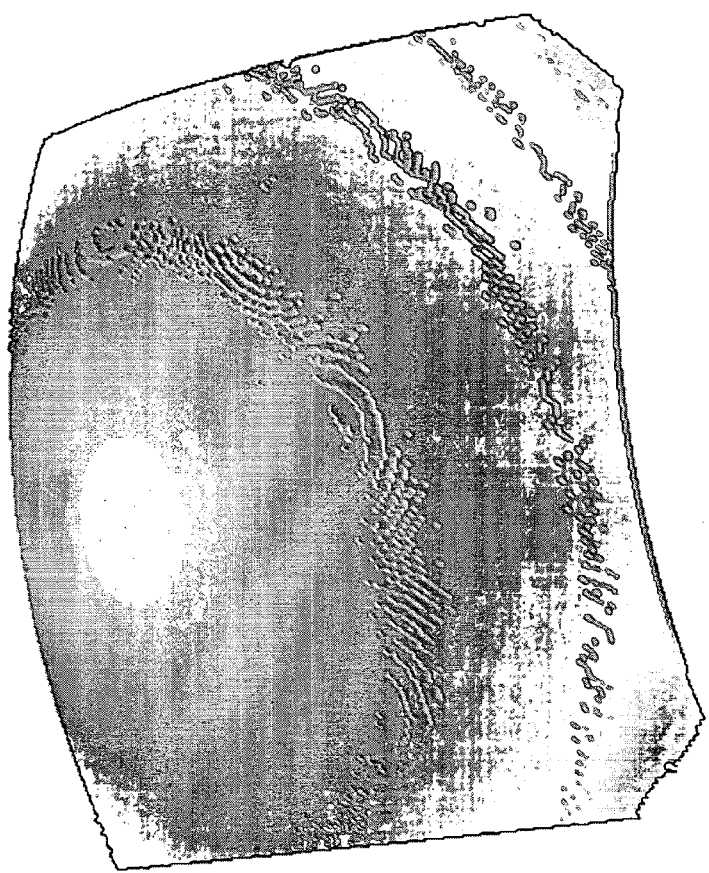
FIG. 13 is the map of a spherical surface calculated using an EVSI algorithm.
Figure 14:
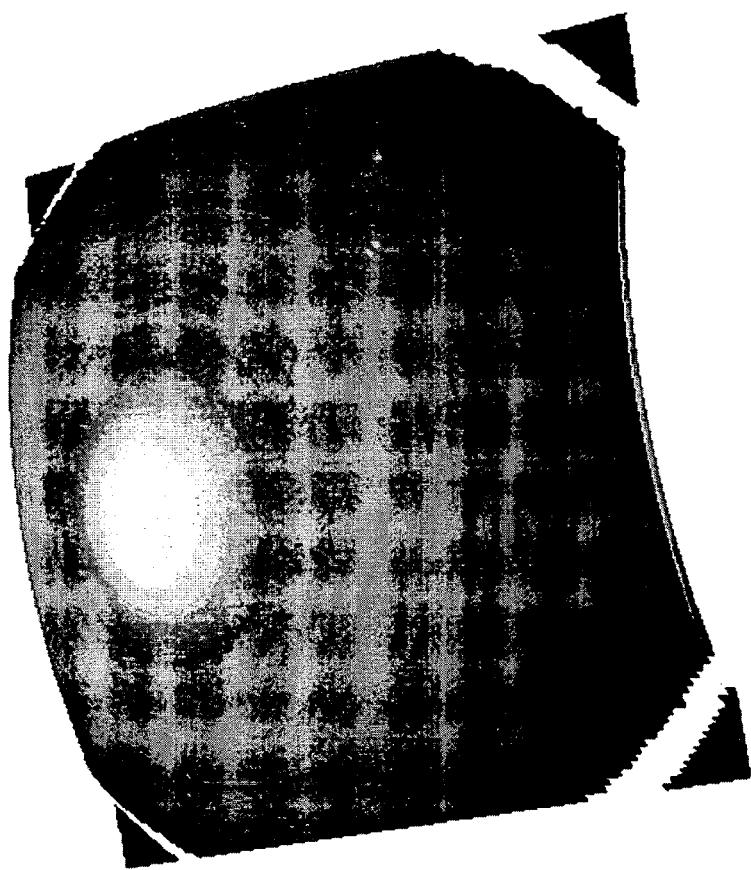
FIG. 14 is the map of the spherical surface of FIG. 13 obtained with the HDVSI algorithm of the invention using the same interferometric data that produced FIG. 13.

FIGS. 11-14 further illustrate the advantages of the invention by comparing EVSI and HDVSI maps obtained from the same interferometric data. FIGS. 11 and 12 are the EVSI and HDVSI maps, respectively, of a flat tilted surface. FIGS. 13 and 14 are the EVSI and HDVSI maps, respectively, of a spherical surface.

While the present invention has been shown and described herein in what is believed to be the most practical and preferred embodiments, it is recognized that departures can be made therefrom within the scope of the invention. For example, neither the VSI-scan nor the phase parameter of the QD-filter used for calculation of the phase of the correlogram has to equal $\pi/2$, but it should be chosen to equal the value that is most appropriate for conducting the VSI scan. Also, the invention has been described in terms of a quadrature demodulation algorithm used to calculate phase in real time. However, it is recognized that quadrature demodulation is a particular case of wavelet filtering and that, as such, other wavelet filters may be used as well, though not as efficiently as QD.

One skilled in the art would also readily recognize that the technique of the invention can be applied in the same general way to map the height of multiple surfaces and the distance between them (i.e., the thickness of the layer between pairs of surfaces). For example, the technique would be suitable for measuring the surfaces and the thickness of a glass plate or a film layer by finding the coarse maps corresponding to the coherence peaks produced at each pixel by the two opposite surfaces of the plate or layer, refining the maps using the corresponding phases calculated concurrently by quadrature-demodulation according to the invention, and finally obtaining the plate or film thickness by the difference between the two maps. Therefore, the invention is not to be limited to the details disclosed herein but is to be accorded the full scope of the claims so as to embrace any and all equivalent processes and products.

The invention claimed is:

1. A method for mapping a sample surface comprising the following steps:
    scanning the sample surface in an interferometer at a predetermined scan step to produce a plurality of interference signals registered on a detector;
    calculating a coarse map of the sample surface by application of a coherence-peak sensing technique on said interference signals;
    calculating a fine map of the sample surface by application of a quadrature-demodulation technique on said interference signals;
    subtracting the fine map from the coarse map of the sample surface to produce a noisy fringe map thereof;
    rounding said noisy fringe map to values corresponding to an integer number of fringes, thereby producing a noise-free fringe map;
    adding the fine map to the noise-free fringe map to obtain a high-definition map of the sample surface; and
    processing said high-definition map to produce a visibly perceptible map of the sample surface;
    wherein said interference signals are used both in the coherence-peak sensing technique and in the quadrature-demodulation technique; and
    wherein said coherence-peak sensing technique and said quadrature demodulation technique are carried out concurrently in real time during said scanning step.

2. The method of claim 1, wherein said sample surface belongs to a layer with two opposite surfaces and the method is used to map each of said surfaces.

3. The method of claim 2, further including the step of calculating a thickness of said layer.

4. The method of claim 1, wherein said coherence-peak sensing technique and said quadrature demodulation technique are carried out concurrently in real time during said scanning step.

5. The method of claim 1, wherein said coherence-peak sensing technique is a center of mass technique.

6. The method of claim 1, wherein said coherence-peak sensing technique is a quadrature center of mass technique.

7. The method of claim 1, wherein said coherence-peak sensing technique is a zero crossing detection technique.

8. The method of claim 1, wherein said quadrature-demodulation technique is a filter with a phase parameter equal to said scan step.

9. The method of claim 1, further including the step of correcting said noise-free fringe map with a frame offset.

* * * * *